United States Patent
Kelly

(10) Patent No.: US 6,377,568 B1
(45) Date of Patent: Apr. 23, 2002

(54) METHOD AND APPARATUS FOR PERFORMING CALL MATCHING FOR INTERNET TELEPHONES IN LEGACY CALL CENTERS

(75) Inventor: Keith C. Kelly, Deerfield Beach, FL (US)

(73) Assignee: NetSpeak Corporation, Boca Raton, FL (US)

(*) Notice: Subject to any disclaimer, the term of this patent is extended or adjusted under 35 U.S.C. 154(b) by 0 days.

(21) Appl. No.: 08/974,652

(22) Filed: Nov. 19, 1997

Related U.S. Application Data

(60) Provisional application No. 60/031,200, filed on Nov. 20, 1996.

(51) Int. Cl.[7] ............................................. H04L 12/66
(52) U.S. Cl. ........................................ 370/352; 370/401
(58) Field of Search ................................. 370/352, 353, 370/354, 355, 356, 357, 360, 401, 402, 403, 405, 406, 389, 392, 410; 709/249, 251, 217, 218, 219

(56) References Cited

U.S. PATENT DOCUMENTS

| | | | |
|---|---|---|---|
| 5,533,102 A | | 7/1996 | Robinson et al. |
| 5,546,452 A | | 8/1996 | Andrews et al. |
| 5,604,737 A | * | 2/1997 | Iwami et al. ................ 370/352 |
| 5,724,412 A | * | 3/1998 | Srinivasan ................ 379/93.23 |
| 5,818,836 A | * | 10/1998 | DuVal ........................ 370/389 |
| 5,848,143 A | | 12/1998 | Andrews et al. |
| 5,884,032 A | * | 3/1999 | Bateman et al. ............ 709/204 |
| 6,026,086 A | * | 2/2000 | Lancelot et al. ............ 370/353 |

* cited by examiner

Primary Examiner—Kwang B. Yao
(74) Attorney, Agent, or Firm—Kudirka & Jobse, LLP

(57) ABSTRACT

A technique for matching Internet telephone calls originating on a packet-switched data network with legacy automatic call distribution centers on a public switched telephone network utilizes a gateway architecture to accommodate disparate network architecture and protocols. The gateway receives a call on an Internet Protocol-based network, placing the call in queue at a gateway port, and places an analogous call over a traditional PSTN line to a legacy call center. The gateway provides the call center with information identifying the port at which the IP based call is queued. The call center is provided with software capable of resolving the identification information into the network protocol address of the gateway and the actual port for establishing a dual communication path, both over a PSTN network, and an Internet protocol address to the caller. Upon connection to the gateway the legacy call center may complete both the PSTN audio communication path and the packet-switched connection, both of which appear to the caller as a single connection.

15 Claims, 5 Drawing Sheets

METHOD AND APPARATUS FOR PERFORMING CALL MATCHING FOR INTERNET TELEPHONES IN LEGACY CALL CENTERS

RELATED APPLICATIONS

This application claims priority to U.S. Provisional Patent Application No. 60/031,200 entitled Method and Apparatus for Performing Call Matching For Internet Telephones in Legacy Call Centers by Keith C. Kelly, filed Nov. 20, 1996.

In addition, the subject matters of the following related copending applications are incorporated herein by reference:

U.S. patent application Ser. No. 08/533,115 entitled Point-to-Point Internet Protocol, by Glenn W. Hutton, filed Sep. 25, 1995;

U.S. patent application Ser. No. 08/719,894, entitled Directory Server For Providing Dynamically Assigned Network Protocol Addresses, by Mattaway et al., filed Sep. 25, 1996;

U.S. patent application Ser. No. 08/721,316, entitled Graphic User Interface For Internet Telephony Application, by Mattaway et al., filed Sep. 25, 1996;

U.S. patent application Ser. No. 08/719,891, entitled Method And Apparatus For Distribution And Presentation Of Multimedia Data Over A Computer Network, by Mattaway et al., filed Sep. 25, 1996;

U.S. patent application Ser. No. 08/719,554, entitled Point-to-point Computer Network Communication Utility Utilizing Dynamically Assigned Network Protocol Addresses, by Mattaway et al., filed Sep. 25, 1996;

U.S. patent application Ser. No. 08/719,640, entitled Method And Apparatus For Dynamically Defining Data Communication Utilities, by Mattaway et al., filed Sep. 25, 1996;

U.S. patent application Ser. No. 08/719,898, entitled Method And Apparatus For Providing Caller Identification Based Out-going Messages In A Computer Telephony Environment, by Mattaway et al., filed Sep. 25, 1996;

U.S. patent application Ser. No. 08/718,911, entitled Method And Apparatus For Providing Caller Identification Based Call Blocking In A Computer Telephony Environment, by Mattaway et al., filed Sep. 25, 1996;

U.S. patent application Ser. No. 08/719,639, entitled Method And Apparatus For Providing Caller Identification Responses In A Computer Telephony Environment, by Mattaway et al., filed Sep. 25, 1996; and U.S. patent application Ser. No. 08/911,133, entitled Method and Apparatus for Establishing Communications Between Packet-Switched and Circuit-Switched Networks, by Keith C. Kelly, filed Aug. 14, 1997;

U.S. patent application Ser. No. 08/911,519, entitled Domain Name Server Architecture for Translating Telephone Number Domain Names into Network Protocol Addresses, by Keith C. Kelly, filed Aug. 14, 1997; and

FIELD OF THE INVENTION

The invention relates, generally, to data processing systems and telecommunication systems, and, more specifically, to a technique for matching Internet telephone calls with legacy call centers.

BACKGROUND OF THE INVENTION

The worldwide web and Internet, in general, have created a completely new venue in which to obtain information, purchase services and goods, etc. Accordingly, many vendors of products and services have established web sites containing information about products, services, etc., including "1-800" telephone numbers which connect via public switched telephone networks to traditional call center apparatus and E-mail addresses which connect via the Internet to the vendor's website or electronic mailbox. Due to the disparity between the architecture and addressing protocols utilized by traditional public switch telephone networks, i.e. a circuit-switched telephone network, and the Internet, i.e. a packet-switched data network, it has been previously difficult to establish a real-time communication link between a user exploring a website with a browser and an actual human operator at a call center. Existing call center apparatus already in place at a vendor's location, i.e. a "legacy" call center such as a Galaxy call center product line, commercially available from Rockwell International, Downers Grove, Ill., is accessible via traditional public switched telephone networks, i.e. a circuit-switched network. The same vendor's website, however, may only be accessible via the Internet, i.e. a packet-switched data network.

Circuit-switched networks operate by establishing a dedicated connection or circuit between two points, similar to public switched telephone networks(PSTN). A telephone call causes a circuit to be established from the originating phone through the local switching office across trunk lines, to a remote switching office and finally to the intended destination telephone. While such circuit is in place, the call is guaranteed a data path for digitized or analog voice signals regardless of other network activity.

In contrast, packet-switched networks typically connect computers and establish an asynchronous "virtual" channel between two points. In a packet-switched network, data, such as a voice signal, is divided into small pieces called packets which are then multiplexed onto high capacity connections for transmission. Network hardware delivers packets to specific destinations where the packets are reassembled into the original data set. With packet-switched networks, multiple communications among different computers can proceed concurrently with the network connections shared by different pairs of computers concurrently communicating. Packet-switched networks are, however, sensitive to network capacity. If the network becomes overloaded, there is no guarantee that data will be timely delivered. Despite this drawback, packet-switched networks have become quite popular, particularly as part of the Internet and Intranets, due to their cost effectiveness and performance.

In a packet-switched data network one or more common network protocols hide the technological differences between individual portions of the network, making interconnection between portions of the network independent of the underlying hardware and/or software. A popular network protocol, the Transmission Control Protocol/Internet Protocol (TCP/IP) is utilized by the Internet and Intranets. Intranets are private networks such as Local Area Networks (LANs) and Wide Area Networks (WAN). The TCP/IP protocol utilizes universal addressing as well as a software protocol to map the universal addresses into low level machine addresses. For purposes of this discussion, networks which adhere to the TCP/IP protocol will be referred to hereinafter "IP-based" or as utilizing "IP addresses" or "Internet Protocol address".

As a result, a potential purchaser of goods or services has had to establish two separate communication connections, one connection to a vendor's website to view on-line information, and a second connection over traditional PSTN network to the vendor's 1-800 number for connection to a human operator via a legacy call center. Given the substantial costs of existing call center apparatus and the investments made therein by vendors, many vendors are unwilling to discard or replace their existing legacy call centers to accommodate the ever-increasing on-line group of on-line consumers.

Accordingly, a need exists for a technique by which a caller may establish a single communication connection to view both a vendor's on-line information and to interact directly with an operator at an existing legacy call center facility.

A further need exists for a manner in which the existing installed based of legacy call centers may be utilized to respond to calls originating from both a PSTN network and from the Internet.

An additional need exists for a manner in which call center operators may converse with a caller over a DSTN legacy call center connection for audio communications while exchanging data and other on-line information with the same caller through a packet-switched connection.

SUMMARY OF THE INVENTION

The present invention provides a technique for matching Internet telephone calls originating on a packet-switched data network with legacy automatic call distribution centers on a public-switched telephone network. A packet-switched call on an Internet Protocol-based network is delivered to a gateway. The gateway places a corresponding call over a circuit-switched network to legacy a call center. The gateway provides an identifier to the call center apparatus identifying which port at the gateway the IP-based call is waiting. When available, the call center apparatus routes the circuit-switched call to an agent. When the agent answers the circuit-switched call, the identifier is presented to the agent and entered into call matching software which establishes a packet-switched data communication back to the appropriate port of the gateway. The agent may then communicate audio data with the caller over a traditional PSTN call center apparatus while sharing video and other type of data over a packet-switched data network. The gateway splits and rejoins the two disparate data types into a single connection back to the caller.

In accordance with one aspect of the invention, a method for use with a gateway apparatus operatively coupling a packet-switched data network to a circuit-switched communication network comprises the steps of receiving a first packet switch call from a calling process, assigning the first packet-switched call to one of the gateway ports, establishing a communication connection to terminating apparatus over the circuit-switched and to terminating apparatus over the circuit-switched network, providing the terminating apparatus with information identifying the first packet-switched call and establishing a dual communication path from the terminating apparatus to the call process over the circuit-switched communication network and the packet-switched data network, in response to a second packet-switched call from the terminating apparatus. In one embodiment, the information identifying the first packet-switched call comprises information identifying the gateway and the communication port at which the first call is queued. In another embodiment, the step of providing information identifying the first call comprises generating a series of signals which may be audible signals or DTMF signals.

In accordance with a second aspect of the invention, a computer program product for the use with gateway computer system operatively coupling a packet-switched data network to a circuit-switched communication network comprises a computer usable medium having program code embodied thereon, the program code comprising code for receiving a first packet-switched call from a call process, program code for signing the first packed-switched call to one of the communication ports, program code for establishing a communication connection over the circuit-switched network to a terminating apparatus, program code for providing a terminating apparatus with information identifying the first call, and program code responsive to a second packet-switched call from the terminating apparatus, for establishing a dual communication path from the terminating apparatus to the gateway over both the packet-switched data networks and the circuit-switched communication network. In one embodiment, the computer program product further comprises program code for establishing a point-to-point communication connection with a process over a packet-switched data network.

In accordance with a third aspect of the invention, an apparatus for facilitating communications between packet-switched networks and circuit-switched communication networks comprises a processor, a memory coupled to the processor, a first network interface operatively coupling the processor and memory to a packet-switched data network, the first network interface having a plurality of communication ports, a second network interface operatively coupling a processor and memory to a circuit-switched communication network, and identification module operatively coupled to the second network interface and configured to generate identification signals, means responsive to an incoming packet-switched call for assigning a packet-switched call to one of the communication ports, and means for translating data from the circuit-switched communication network to the packet-switched data network. In one embodiment, the identification module comprises means for generating identification signals in the auditory range of human hearing or in DTMF format. In another embodiment, the identification signal comprise information identifying the server apparatus and information identifying one of the communication ports on a server apparatus.

In accordance with a fourth aspect of the invention, a computer program product for use with a computer system operatively coupled to a gateway apparatus over a packet-switched data network comprising a computer usable medium having computer program code embodied thereon, the computer code comprises program code for receiving information identifying a first packet-switched call, program code for resolving the information for identifying the packet-switched call into an identifier of the gateway at which the first call is queued, and program code for establishing a point-to-point communication connection to the gateway over the packet-switched data network.

BRIEF DESCRIPTION OF THE DRAWINGS

The above and other features, objects, and advantages of the invention will be better understood by referring to the following description in conjunction with the accompanying drawing in which.

DETAILED DESCRIPTION

Figure 1:
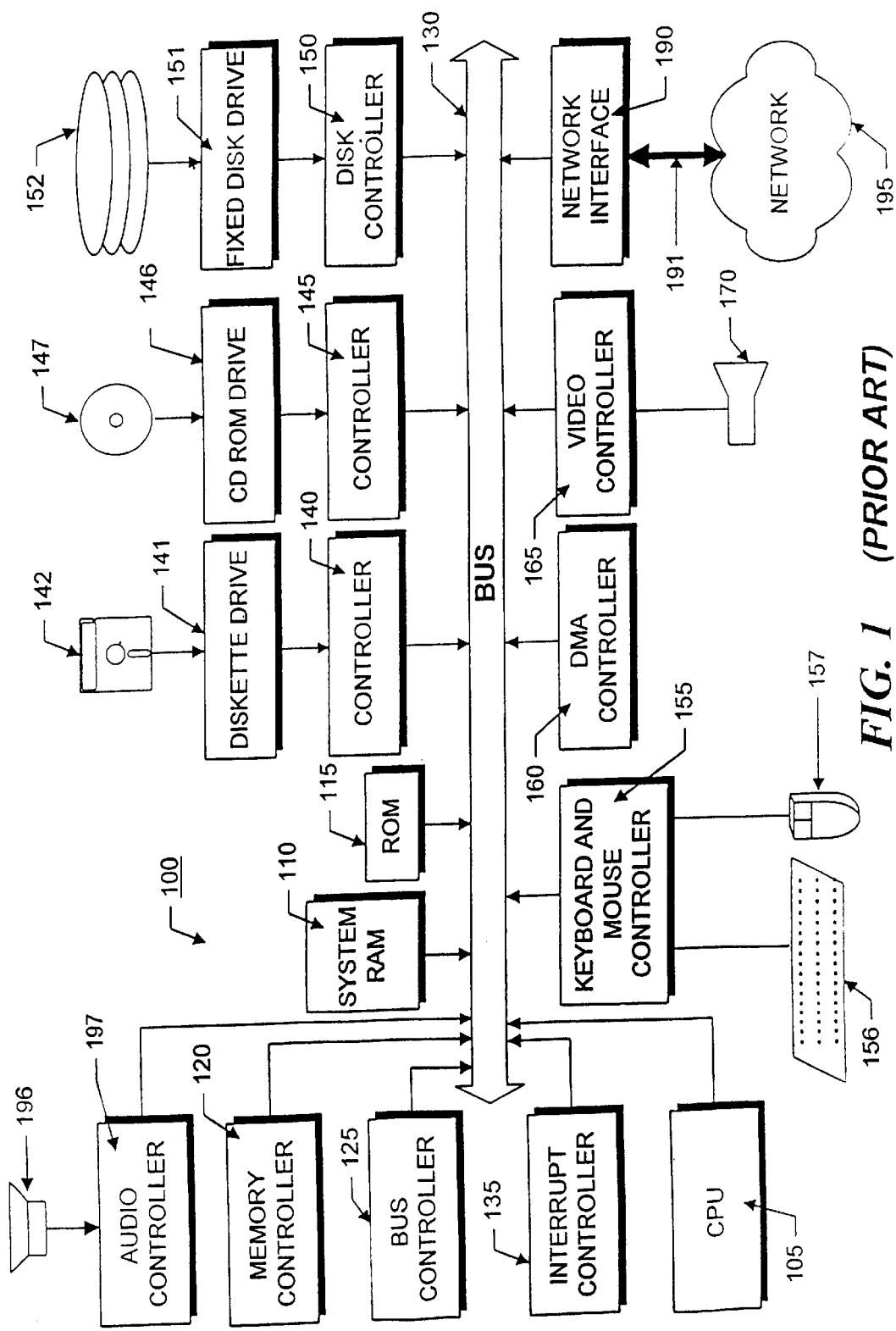
FIG. 1 is a block diagram of a computer systems suitable for use with the present invention.

FIG. 1 illustrates the system architecture for a computer system 100, such as an IBM PS/2® computer on which the invention can be implemented. The exemplary computer system of FIG. 1 is for descriptive purposes only. Although the description below may refer to terms commonly used in describing particular computer systems, such as an IBM PS/2 computer, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insert able into CD ROM drive 146 which is connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices such as a pen and/or tablet and a microphone for voice input may be connected to computer system 100 through bus 130 and an appropriate controller/software. DNA controller 160 is provided for performing direct memory access to system RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Computer system 100 is generally controlled and coordinated by operating system software, such the OS/2® operating system, available from International Business Machines Corporation, Armonk, N.Y. or Windows NT operating system, available from MicroSoft Corporation, Redmond, Wash. The operating system controls allocation of system resources and performs tasks such as process scheduling, memory management, and networking and I/O services, among other things. The present invention is intended for use with a multitasking operating system, such as those described above which are capable of simultaneous multiple threads of execution. For purposes of this disclosure a thread can be thought of as a "program" having an instruction or sequence of instructions and a program counter dedicated to the thread. An operating system capable of executing multiple threads simultaneously, therefore, is capable of performing multiple programs simultaneously.

Telecommunication Environment

Figure 2:
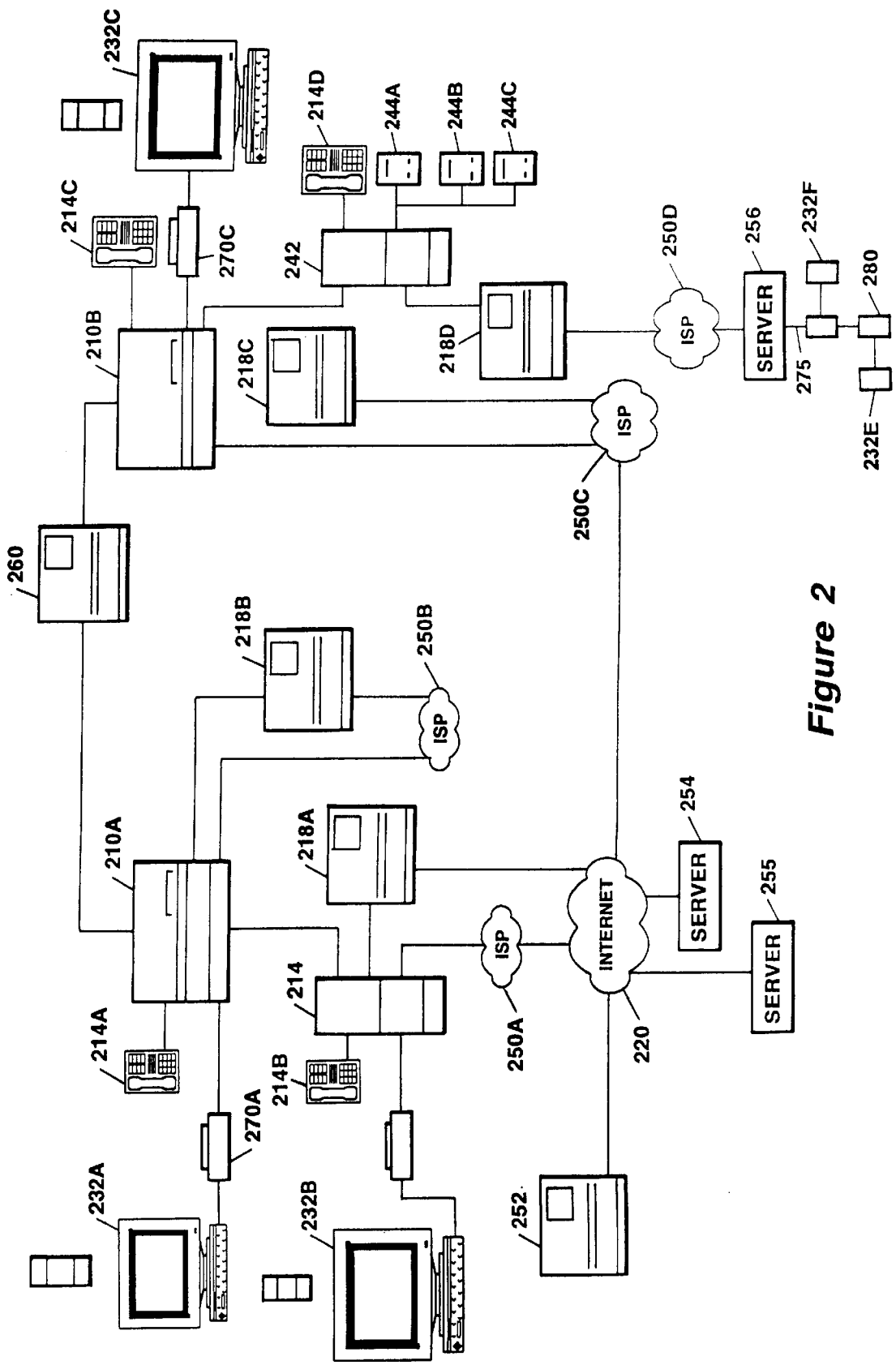
FIG. 2 is a conceptual illustration of a communications network environment in which the present invention may be utilized.

FIG. 2 illustrates a telecommunications environment in which the invention may be practiced such environment being for exemplary purposes only and not to be considered limiting. Network 200 of FIG. 2 illustrates a hybrid telecommunication environment including both a traditional public switched telephone network as well as Internet and Intranet networks and apparatus bridging between the two. The elements illustrated in FIG. 2 are to facilitate an understanding of the invention. Not every element illustrated in FIG. 2 or described herein is necessary for the implementation or the operation of the invention.

A pair of PSTN central offices 210A–B serve to operatively couple various terminating apparatus through either a circuit switched network or a packet switched network. Specifically, central offices 210A–B are interconnected by a toll network 260. Toll network 260 may be implemented as a traditional PSTN network including all of the physical elements including routers, trunk lines, fiber optic cables, etc. Connected to central office 210A is a traditional telephone terminating apparatus 214 and an Internet telephone 232A. Terminating apparatus 214 may be implemented with either a digital or analog telephone or any other apparatus capable of receiving a call such as modems, facsimile machines, etc., such apparatus being referred to collectively hereinafter as a terminating apparatus, whether the network actually terminates. Further, the PSTN network may be implemented as either an integrated services digital network (ISDN) or a plain old telephone service (POTS) network. The Internet telephony is conceptually illustrated as a telephone icon symbolizing the Internet telephone client application executing on a personal computer and interconnected to central office 210A via a modem 270A. Similarly, telephone 214C is connected to central office 210D and WebPhone 232C is connected to central office 210B via modem 270C. Central offices 210A–B are, in turn, operatively coupled to Internet 220 by ISP 250B and 250C, respectively. In addition, central office 210A is coupled to ISP250B by gateway 218B. Similarly, central office 210B is connected to ISP 250C by gateway 218C. In addition, a telephone 214B and Internet telephone 232B, similar to telephone 214A and Internet telephone 232A, respectively, are interconnected to Internet 220 via PBX 212, gateway 218A and ISP 258A. In addition, global server 252 is coupled to the Internet 220 are a domain name system server 254 and 255. Global server 252 may be implemented as described in U.S. patent application Ser. No. 08/719,894, entitled Directory Server for Providing Dynamically Assigned Network Protocol Addresses, previously referenced and incorporated herein. A global server suitable for use as Global Server 252 is commercially available from NetSpeak Corporation in the form of a collection of intelligent software modules including connection server Part No. CSR1, information server, Model ISR1, and database server, Model DBSR1. Name servers 254 and 255 are described as set forth hereinafter. Finally, Internet Service Providers (ISPs) 250A–D may comprise any number of currently commercially available Internet service providers such as America On Line, the IBM Global Network, etc. An Intranet implemented as LAN 275 is coupled to Internet 220 via ISP 250D and server 256. Server 256 may have the architecture as illustrated in FIG. 1 and functions as a proxy server for LAN 275 to which WebPhone 232E is connected via a LAN-based TCP/IP network connector 280. A plurality of Internet telephone 232F and 232E are coupled to LAN 275 via LAN connectors 280. The gateways and Internet telephony client applications may be implemented as set forth in greater detail hereinafter.

WebPhone Client

Internet telephone 232 may be implemented as described in the previously referenced U.S. patent applications incorporated herein by reference. An Internet telephony application suitable for use with the present invention is the WebPhone 1.0, 2.0 or 3.0, client software application commercially available from NetSpeak Corporation, Boca Raton, Fla., referred to hereafter as the WebPhone client or WebPhone process. For the remainder of this description, the Internet telephone will be referred to as the WebPhone client. It will be obvious to those reasonably skilled in the arts that other Internet telephone applications implementing similar functionality may be substituted for the WebPhone client without affecting the inventive concepts contained herein. The WebPhone client comprises a collection of intelligent software modules which perform a broad range of Internet telephony functions. For the purpose of this disclosure, a "virtual" WebPhone client refers to the same functionality embodied in the WebPhone client application without a graphic user interface. Such virtual WebPhone client can be embedded into a gateway, automatic call distribution, server, or other apparatus which do not require extensive visual input/output from a user and may interact with any other WebPhone clients or servers adhering to the WebPhone protocol. For the purpose of this disclosure, WebPhone client 232 or any of the virtual WebPhone clients may be implemented in other apparatus, may be considered WebPhone client applications, "WebPhone Clients".

The WebPhone software applications may run on the computer system described with reference to FIG. 1, or a similar architecture whether implemented as a personal computer or dedicated server. In such an environment, the sound card 197 accompanying the computer system 100 of FIG. 1, may be an MCI compliant sound card while communication controller 190 may be implemented through either an analog modem 270 or a LAN-based TCP/IP network connector 280 to enable Internet/Intranet connectivity.

The WebPhone clients, as well as any other apparatus having a virtual WebPhone embodied therein, each have their own unique E-mail address and adhere to the WebPhone Protocol and packet definitions, as extensively described in the previously referenced related U.S. patent applications. For the reader's benefit, short summary of a portion of the WebPhone Protocol is set forth to illustrate the interaction of WebPhone clients with each other and the connection/information server 252 when establishing a communication connection.

Each WebPhone client, may serve either as a calling party or a caller party, i.e. the party being called. The calling party transmits an on-line request packet to a connection/information server upon connection to an IP-based network, e.g. the Internet or an Intranet. The on-line request packet contains configuration and settings information, a unique E-mail address and a fixed or dynamically assigned IP address for the WebPhone client. The callee party, also a utilizing a WebPhone client, transmits a similar on-line request packet containing its respective configuration and setting information, E-mail address and IP address to the same or a different connection server upon connection to an IP-based network. The calling party originates a call by locating the callee party in a directory associated with either its own WebPhone client or the connection/information server to which it is connected. The callee party may be identified by alias, E-mail address or key word search criteria. Once the E-mail address of the calling party is identified, the calling party's WebPhone forwards a request packet to the connection/information server, the request packet containing the callee party's E-mail address. The connection/information server uses the E-mail address in the received request packet to locate the last known IP address assigned to the callee party. The connection/information server then transmits to the calling party an information packet containing the IP address of the callee party. Upon receipt of the located IP address from the connection server, the calling party's WebPhone client initiates a direct point-to-point communication link with the callee party by sending a call packet directly to the IP address of the callee party. The callee party either accepts or rejects the call with appropriate response packets. If the call is accepted, a communication session is established directly between the caller and the callee, without intervention of the connection/information server. The above scenario describes establishment of a communication link which originates and terminates with clients on an IP-based network.

To facilitate interaction with WebPhone clients, a virtual WebPhone is implemented in the gateway 218, either executable in RAM memory or embedded in ROM memory associated with such apparatus. The gateway 218 comprises a virtual WebPhone client which acts as a proxy device and voice processing hardware that bridges from an IP-based network to a PSTN network. The gateway 218 may be implemented with either a microprocessor based architecture or with dedicated digital signal processing logic and embedded software. A gateway suitable for use as gateway 218 with the present invention is either NetSpeak Model Nos. WGX-MD/24, a 24-port digital T-1 IP telephony gateway, or WGX-M/16, a 16-port analog IP telephony gateway, both commercially available from NetSpeak Corporation, Boca Raton, Fla. Gateway 218 is described in greater detail with reference to FIG. 3 hereinafter.

One of the capabilities of the gateway 218 is to bridge between the PSTN and Internet/Intranet, and the Internet/Intranet and the PSTN. Gateway 218 virtualizes the PSTN call, making it appear as just another WebPhone client call. This virtual WebPhone process interfaces with ACD server 242 so that incoming PSTN calls can be routed to agent WebPhone processes with the tracking, distribution, and monitoring features of the ACD server 2424, as described hereinafter. For incoming calls originating on a PSTN, gateway 218 provides to ACD server 242 information about incoming calls so that proper call routing can ensue, such information possibly comprising Caller ID (CLID), automatic number identification (ANI), DNIS, PBX trunk information, from the central office 210, or other information collected by voice response units.

A communication link over a packet-switched network may be established with the network illustrated in FIG. 2A, using the WebPhone protocol as disclosed in U.S. patent application Ser. No. 08/533,115 entitled "POINT-TO-POINT INTERNET PROTOCOL" by Glenn W. Hutton, filed Sep. 25, 1995, previously incorporated herein by reference. Specifically, WebPhone 232A may connect to Internet 220 through central office 210A, ISP 250B and register with global server 252, notifying server 252 of its current dynamically signed Internet protocol address. Subsequently, WebPhone client 232A may inquire as to the current Internet protocol address of another WebPhone client, for example, WebPhone client 232C. If WebPhone client 252 is currently connected to the Internet and has likewise registered with the global server 252 will return the Internet protocol address of WebPhone 232C to WebPhone 232A. WebPhone client 232A may then establish a direct connection to WebPhone client 232C via central office 210A, ISP 250B, Internet 220, ISP 250C, and central office 210B. Alternatively, a point-to-point connection over a packet-switched network may be established over a local area network 275 by means of a direct connection from Web-Phone clients 232E to 232F, such connection being possible if the Internet protocol addresses of the respective Web-Phones processes are fixed.

Figure 3:
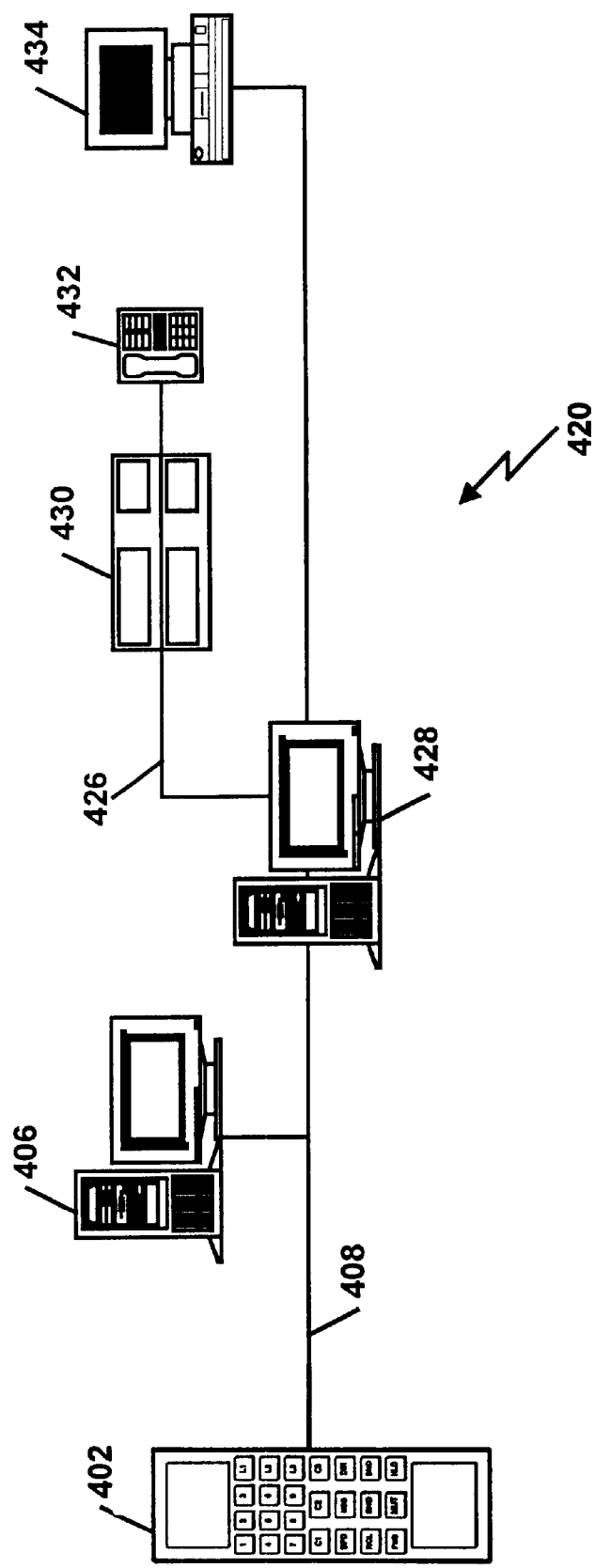
FIG. 3 is a conceptual block diagram of a simplified communication environment in which the present invention may be utilized.

A simplified telecommunication environment is illustrated in FIG. 3 to facilitate an understanding of the invention. Specifically, customer WebPhone 402 is connected via connection 408 to gateway server 428. Connected to gateway server 428 are an agent WebPhone 434, via a TCP/IP network connection, and a legacy ACD 430 via a traditional public switched telephone network connection 426. Coupled to ACD 430 is a traditional PSTN terminating apparatus 432, as illustrated.

In the illustrative embodiment, ACD 430 is a traditional or legacy gateway which communicates only over a public switched telephone network, such as the Galaxy Automatic Call Distribution product line, commercially available from Rockwell International, Downers Grove, Ill. Terminating apparatus 432 may be implemented with any digital or analog telephone.

Gateway 428 may be implemented similar to gateway 218 of FIG. 2. In the illustrative embodiment, gateway 428 performs a splitting function in which audio from the TCP/UDP connection 408 is unpacketized and translated into either a digital or analog audio stream for transmission along PSTN connection 426 to legacy gateway 430 and onto terminating apparatus 432. In addition, gateway 428 transmits and receives control and other data in packetized form, such as the reference packets explained hereinafter, over a TCP/IP connection to agent desktop 434.

In the illustrative embodiment, gateway 428 may be implemented using the computer architecture described with reference to FIG. 1 herein. In addition, gateway 428 may be implemented utilizing gateway software which implements the functionality of the NetSpeak WebPhone protocol, including any of the WGX-M series, the WGX-MD series and the WGX-L series gateway products commercially available from NetSpeak Corporation, Boca Raton, Fla. In addition to the computer architecture illustrated in FIG. 1, gateway 428 further comprises one or more digital signal processing hardware cards to perform appropriate signal conversion functions. A card suitable for use with the present invention and the previously-mentioned software is the Model D240 and Anteres models, commercially available from Dialogic Corporation, Parsippany, N.J. The number of communication ports available on gateway 428 may be scalable depending on the number of hardware cards and software to provide support therefore. The NetSpeak WGX-L series is available with a 96-port advanced digital T-1 telephony interface. The WGX-M series is available with up to 16-port analog telephony gateway.

In the illustrative embodiment, gateway 428 provides two industry standard interface, first is the conventional circuit switch telephone interface which includes analog lines, T1/E1 lines and ISDN primary rate interfaces. Gateway 428 takes audio and signaling information from a circuit-switched communication network processes the information, compresses or decompresses the information and delivers the information through a logical bridge to the other interface. The second interface provides a conventional packet-switched data interface such as a 10 BaseT, 100 BaseT, frame relay, ATM, etc. As such, gateway 428 provides a bridge between a circuit-switched communication network, i.e., a PSTN network, and a packet-switched data network, e.g., the Internet. The functionality within gateway 428 is supplied via virtual Webphone modules which are similar to the Webphone modules clients previously described herein and further described in the referenced copending patent applications, without a graphic user interface.

Figure 4:
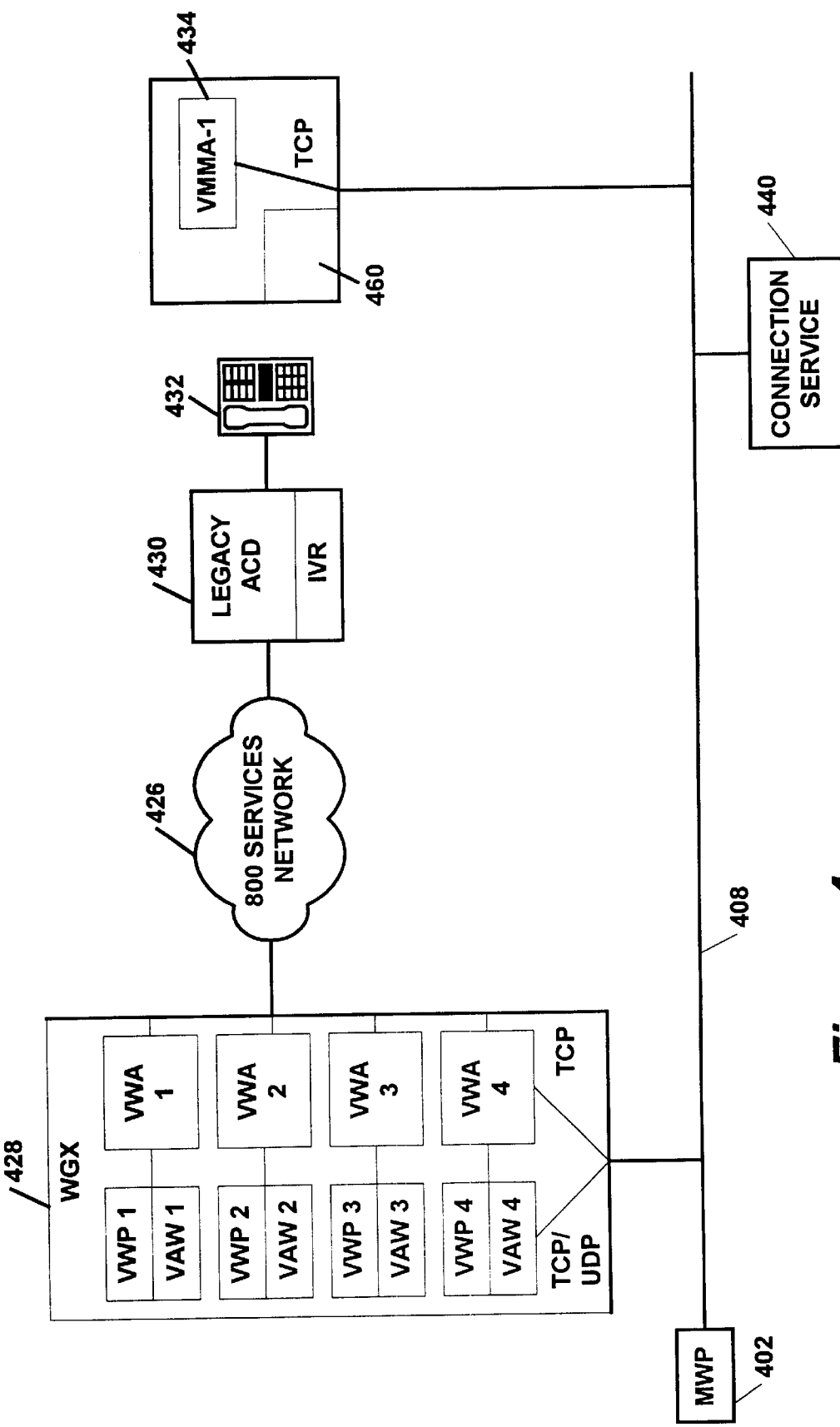
FIG. 4 is a conceptual illustration of the relationship between various processes in accordance with the present invention.

Referring to FIG. 4, a communication environment similar to that illustrated in FIG. 3 is shown with gateway 428 illustrated conceptually in greater detail, and with the addition of a connection/information server 440. The construction and functional implementation of connection/information server 440 is similar to global server 252 of FIG. 2 herein.

In FIG. 4, gateway 428 is illustrated as having four communication ports each of which is coupled to a TCTP/IP network over connection 408 via the transmission control protocol (TCTP). Each port of gateway 428 has associated therewith a virtual webphone (VWP), a virtual agent webphone (VAW), and a virtual whisper agent (VWA). The virtual webphones and virtual agent webphones are connected to a TCTP/IP network via connection 408 using the TCP/UDP protocol. The virtual webphone, as described previously, essentially embodies all the functionality of a webphone client process without the graphic user interface, such an implementation of the webphone Internet telephony application is available as model VWPIPT1 commercially available from NetSpeak Corporation. The virtual webphone software runs with the WGX series of Internet protocol gateway and requires one copy for each telephony port running on the gateway.

The virtual agent webphone provides additional enhancement functionality to the virtual webphone which enables the webphone to report its status and to send URL data packets. The virtual agent webphone software is commercially available from NetSpeak Corporation as product Model No. VAWPGX. The whisper agent software is port enhancement software which provides the ability to generate signals identifying both the gateway and the communication port with which the whisper agent software is associated. In the illustrative embodiment, such identification signals may be auditory signals such as an oral rendition of a port number as would be audible by a human operator of a legacy automatic call distribution center, or, alternatively, such signals may be in the form of dual tone multiple frequency (DTMF) signals capable of being received by an interactive voice response module of a legacy call center. A whisper agent suitable for use with the present invention is commercially available as Model No. WAWGX1 commercially available from NetSpeak Corporation.

In addition to the virtual WebPhone components integrated into gateway 428 which enables the gateway to bridge between a PSTN network and the Internet, a Web-Phone client process 434 is also present at the agent desktop, as illustrated in FIG. 4. Specifically, a version of the Web-Phone client process referred to as a Virtual meet-me (VMMA) agent is loaded onto the operator desktop. The human operators of the legacy call centers are assumed to be operating either multimedia PCs capable of executing the WebPhone client process, or dumb terminals operatively coupled over a private network to a server which is capable of executing the WebPhone client process and the WebPhone protocol associated therewith. The virtual meet-me agent functions similar to the WebPhone client process and adheres to the WebPhone protocol.

Each agent desktop in the legacy call center system may also be configured with a special proprietary database which enables the resolution of a port number and gateway identifier into a E-mail address or other identifier which may be utilized by the Virtual meet-me agent. Such software may be generated using the WebPhone Application Program Interface (WAPI) Software Developers Kit, commercially available from NetSpeak Corporation. Essentially, the proprietary software includes the appropriate algorithms which, given identification signals defining a gateway and a port will resolve the signals into a E-mail identifier such as "sales@NetSpeak.com" or service at "NetSpeak.com". Such a database may be implemented with a conventional look-up table or with a series of appropriate records. The information into the database may be supplied manually by a human agent or directly from an Interactive Voice Response System to the resolution module. Once the E-mail address of the appropriate gateway and the tag information comprising the port identifier at the identified gateway are provided to the virtual meet-me agent, a call is established to the gateway over the TCP/IP network, indicated in FIG. 4 as connection 408 in a manner as previously described herein and as further described in the previously referenced copending patent applications.

Figure 5:
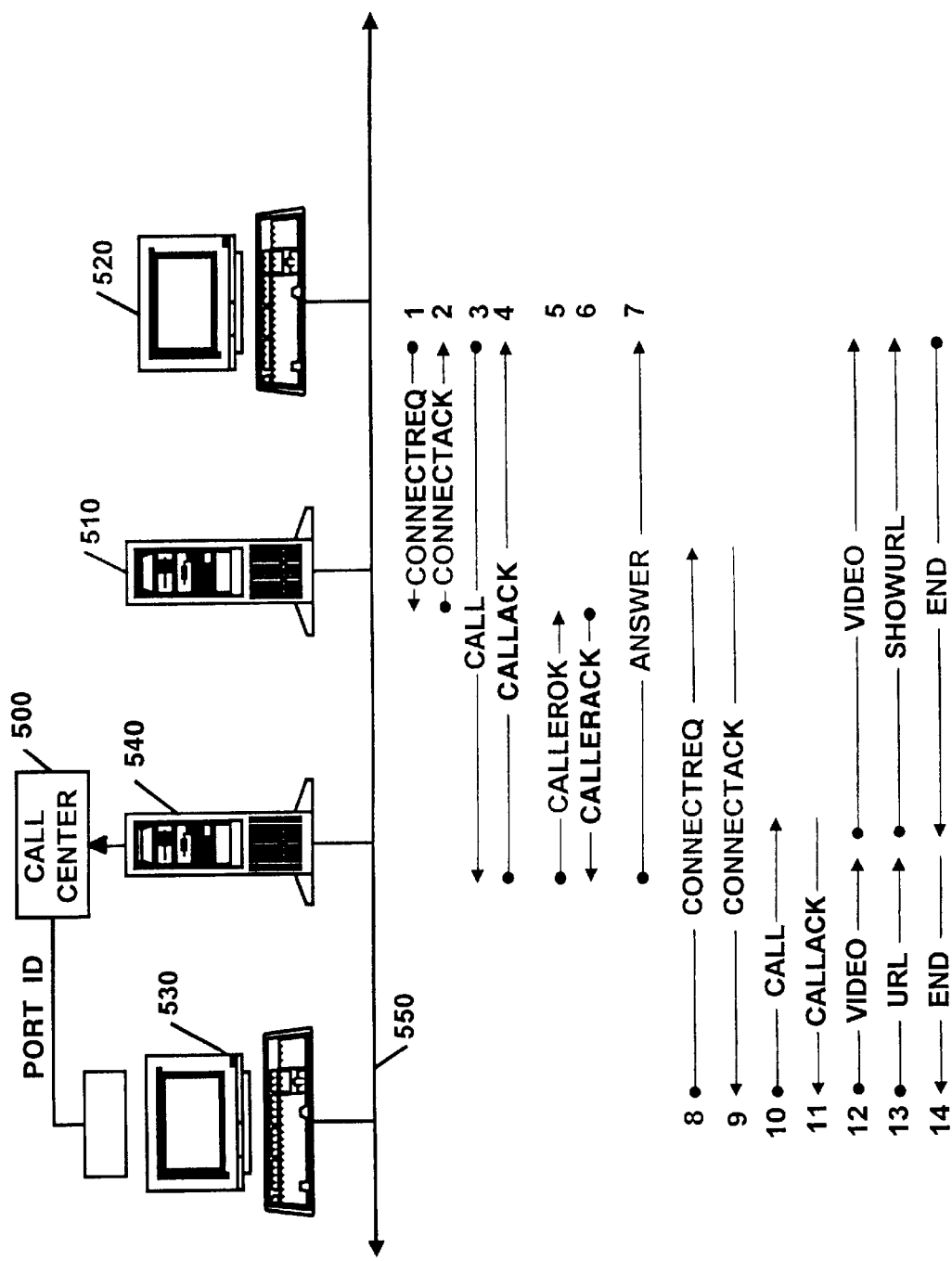
FIG. 5 is a conceptual illustration of a packet transfer sequence in accordance with the invention.

FIG. 5 illustrates schematically a packet transfer sequence between a WebPhone caller process 520, a global server 510, an ACD 500, gateway server 540 and an agent process 530 over network 550. For the purposes of this scenario agent process 530 is assumed to be a virtual meet-me WebPhone client process.

As illustrated in FIG. 5, caller process 520 transmits to connection server 510 a CONNECTREQ package, as illustrated by transmission 1. The format and content of all packets illustrated in FIG. 5 are described in detail in the previously referenced co-pending patent applications. In response, connection server 510 transmits a CONNECTACK packet to caller process 520, as illustrated by transmission 2. With this exchange of packets, the caller process 520 is able to obtain a reference to the appropriate group gateway associated with ACD 500, such as "sales@company.com" and is provided with the Internet Protocol address of the gateway 540 by connection server 510. Next, caller process 520 transmits a CALL packet to gateway server 540, as illustrated by transmission 3, thereby initiating a call to the gateway server 540. In response, gateway server 540 transmits a CALLACK packet to caller process 520, as illustrated by transmission 4. Next, gateway server 540 verifies the validity of the caller process 520 by transmitting a CALLEROK packet to connection server 510, as illustrated by transmission 5. In response, connection server 510 transmits a CALLERACK packet to gateway server 540, as illustrated by transmission 6, indicating that the caller process 520 is valid. The caller validation process and the utilization of the CALLEROK and CALLERACK packet is described in detail in U.S. patent application Ser. No. 08/719,894 entitled DIRECTORY SERVER FOR PROVIDING DYNAMICALLY ASSIGNED NETWORK PROTOCOL ADDRESSES with regard to FIG. 17A thereof.

Next, gateway server 540 sends an ANSWER packet to caller process 520, as illustrated by transmission 7, retains the CALL packet transmitted from caller process 520 and associates the caller process with one of the communication ports of the gateway. For purposes of this explanation, it is assumed that the call is associated with port "2". Gateway server 540 next places a call to legacy call center, illustrated in FIG. 5 as ACD 500, over a circuit-switched data network, typically using a "1-800" service. In one of the illustrative embodiments, ACD 500 is assumed to have integrated therewith an interactive response module (IVR). Upon answering the circuit-switched call from gateway 540, the interactive voice response module will generate a tone indicating that it is ready to receive information. At this point, the whisper agent software associated with port 2 of gateway 540 will generate a series of DTMF signals identifying the gateway and port from which the circuit-switched call is originating. The IVR system converts the DTMF signals into information useful by a human operator at the legacy call center, typically into alphanumeric characters. Upon availability, the operator enters the information identifying the port into the resolution module 460 software associated with the agent desktop. Using the previously-described technique, the resolution software matches the port identification information, i.e., "2" with the E-mail address of the gateway from which the call originated, e.g. "sales@company.com". Next, utilizing the virtual meet-me agent webphone software within the desktop, the agent places a call to the gateway 540. This process is indicated in FIG. 5 by transmission of a CONNECTREQ packet from agent Webphone 530 to connection server 510, as indicated by transmission 8. In response, connection server 510 transmits a CONNECTACK packet to agent WebPhone 530, as illustrated by transmission 9. With this exchange of packets, agent webphone 530 is able to obtain the Internet protocol address of gateway 540.

Webphone agent 530 next transmits a CALL packet to gateway 540 as illustrated by transmission 10, thereby initiating a call to gateway server 540. The port identification information is used in conjunction with Internet protocol address of gateway address 540 to identify the appropriate port to which agent webphone 530 is trying to access. Next, gateway server 540 returns a CALLACK packet to webphone agent 530. In actuality, the CALLACK packet is the original CALL packet transferred from call process 520 to gateway 540. Gateway 540 then connects the call from webphone agent 530 through the appropriate port to open a communication channel between agent webphone 530 and caller process 520. Webphone agent 530 is then free to transmit video data, control information and URL data to caller process 520 over the TCP/IP network connection. Caller process 520, however, communicates audio data to gateway server 540 which translates the packetized audio data into data suitable for transmission over the PSTN connection to the legacy call center and onto the operator at the terminating apparatus.

With the above-described technique, a caller from an IP-based network may call a gateway which then connects the caller through to a legacy call center. An operator at the legacy call center is then capable of establishing a dual communication path with the caller. Audio data is communicated from the operator through the traditional PSTN network to the gateway for packetization and forwarding onto caller process 520. Video data and URL data may be exchanged from the agent webphone 530 to the caller process 520 over a direct TCTP/IP connection. In this manner, gateway server 540 acts as a splitter and combiner of the different data types and network protocols. To caller process 520, the call center operator appears to be communicating over a single communication connection, despite the fact that the audio is actually being transmitted through a traditional PSTN network from a legacy call center.

The protocol for transmission of URL data using a WebPhone process is described in U.S. patent application Ser. No. 08/974,329 entitled Method and Apparatus for Delivering Content Data Streams Annotated With References To Remote Resources, by Keith C. Kelly, filed on an even date herewith and incorporated herein by reference.

In legacy call centers which do not have IVR modules, the whisper agent instead of generating DTMF tones generates audible signals identifying the appropriate communication port. The call center operator upon answering the PSTN call from the gateway, listens to the continual "whispering" of the port identifier and then enters the port identifier into the resolution module 460. The whisper agent continues to whisper the port identifier until the webphone agent 530 establishes a connection to the appropriate communication port of gateway server 540.

A software implementation of the above-described embodiments may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. Further, many of the system components described herein such as the client application and the gateway have been described using products from NetSpeak Corporation. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. In a gateway apparatus operatively coupling a packet-switched data network to a circuit-switched communication network, the gateway apparatus having a number of communication ports and accessible over a packet-switched network via a network protocol address, a method comprising:
   A. receiving a first packet-switched call from a calling process;
   B. assigning the first packet-switched call to one of the gateway ports;
   C. establishing a communication connection to call center terminating apparatus over the circuit-switched network;
   D. providing the call center with audio information identifying the first packet-switched call; and
   E. in response to a second packet-switched call from the call center terminating apparatus, establishing a dual communication path over circuit-switched network and the packet-switched network to the call process.

2. The method of claim 1 wherein the audio information identifying the first packet-switched call comprises information identifying the gateway on the packet-switched network.

3. The method of claim 1 wherein the audio information identifying the first packet-switched call comprises information identifying a port on the gateway.

4. The method of claim 1 wherein D comprises:
   D.1 providing a series of audio signals comprising identification information to the call center.

5. The method of claim 4 wherein the series of audio signals comprise human speech.

6. The method of claim 4 wherein the series of audio signals comprise dual tone multiple frequency (DTMF) signals.

7. A computer program product for use with a gateway computer system operatively coupling a packet-switched data network to a circuit-switched communication network, the gateway computer system having a plurality of communication ports and addressable over the packet-switched data network by a network protocol address, the computer program product comprising a computer usable medium having program code embodied thereon, the program code comprising:
   a. program code for receiving a first packet-switched call from a call process;
   b. program code for assigning the first packet-switched call to one of the communication ports;
   c. program code for establishing a communication connection over the circuit-switched communication network to a call center;
   d. program code for providing the call center with audio information identifying the first packet-switched call; and
   e. program code, responsive to a second packet-switched call from the call center for establishing a dual communication path from the call center to the gateway process over both the packet-switched data network and the circuit-switched communication network.

8. The computer program product of claim 7 further comprising:
   program code for establishing a point-to-point communication connection with a process over a packet-switched data network.

9. An apparatus for facilitating communications between packet-switched networks and circuit-switched communication networks comprising:
   a. a processor;
   b. a memory coupled to the processor;

c. a first network interface operatively coupling the processor and memory to a packet-switched data network, the first network interface having a plurality of communication ports;

d. a second network interface operatively coupling the processor and memory to a circuit-switched communication network;

e. an identification module, operatively coupled to the second network interface, and configured to generate audio identification signals which identify the apparatus and provide the generated audio identification signals to a call center;

f. program logic, responsive to an incoming packet-switched call, for assigning a packet-switched call to one of the communication ports; and g. program logic for translating data from the circuit-switched communication network to the packet-switched data network.

10. The apparatus of claim 9 wherein the identification module comprises program logic for generating audio identification signals in the form of human speech.

11. The apparatus of claim 9 wherein the identification module comprises program logic for generating audio identification signals in DTMF format.

12. The apparatus of claim 9 wherein the audio identification signals comprise information identifying the apparatus.

13. The apparatus of claim 9 in which the audio identification signals comprise information identifying one of the communication ports.

14. The apparatus of claim 9 further comprising:

program logic for establishing a point-to-point communication connection with a process over a packet-switched data network.

15. The apparatus of claim 9 further comprising:

program logic for establishing a communication network with the call center over a circuit-switched communication network.

* * * * *